Sept. 20, 1971     A. G. CARTER     3,606,455
SAFETY HARNESS
Filed April 29, 1969     5 Sheets-Sheet 1
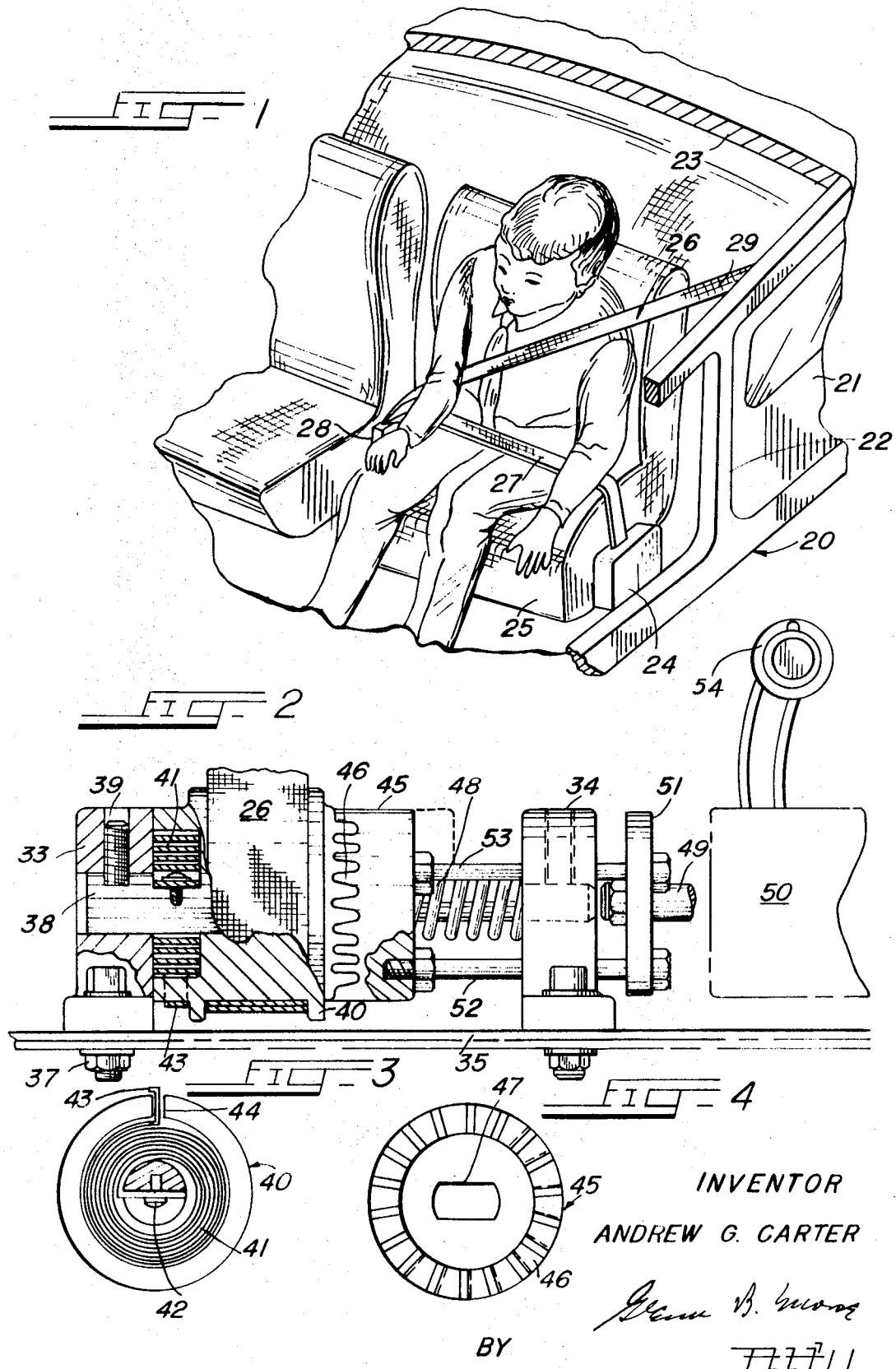
INVENTOR
ANDREW G. CARTER
BY Sept. 20, 1971      A. G. CARTER      3,606,455
SAFETY HARNESS
Filed April 29, 1969      5 Sheets-Sheet 2
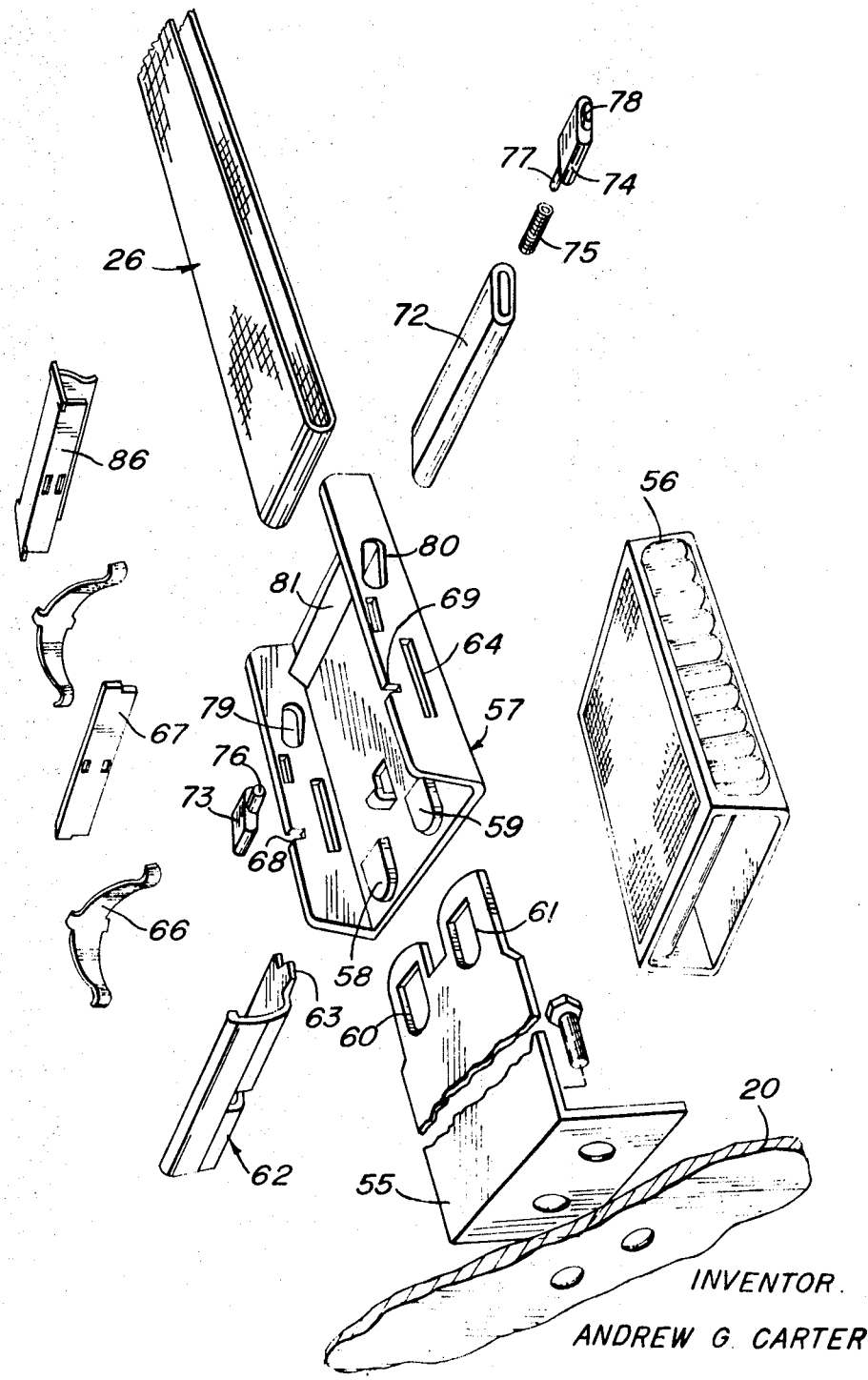
FIG_5
INVENTOR.
ANDREW G. CARTER
BY

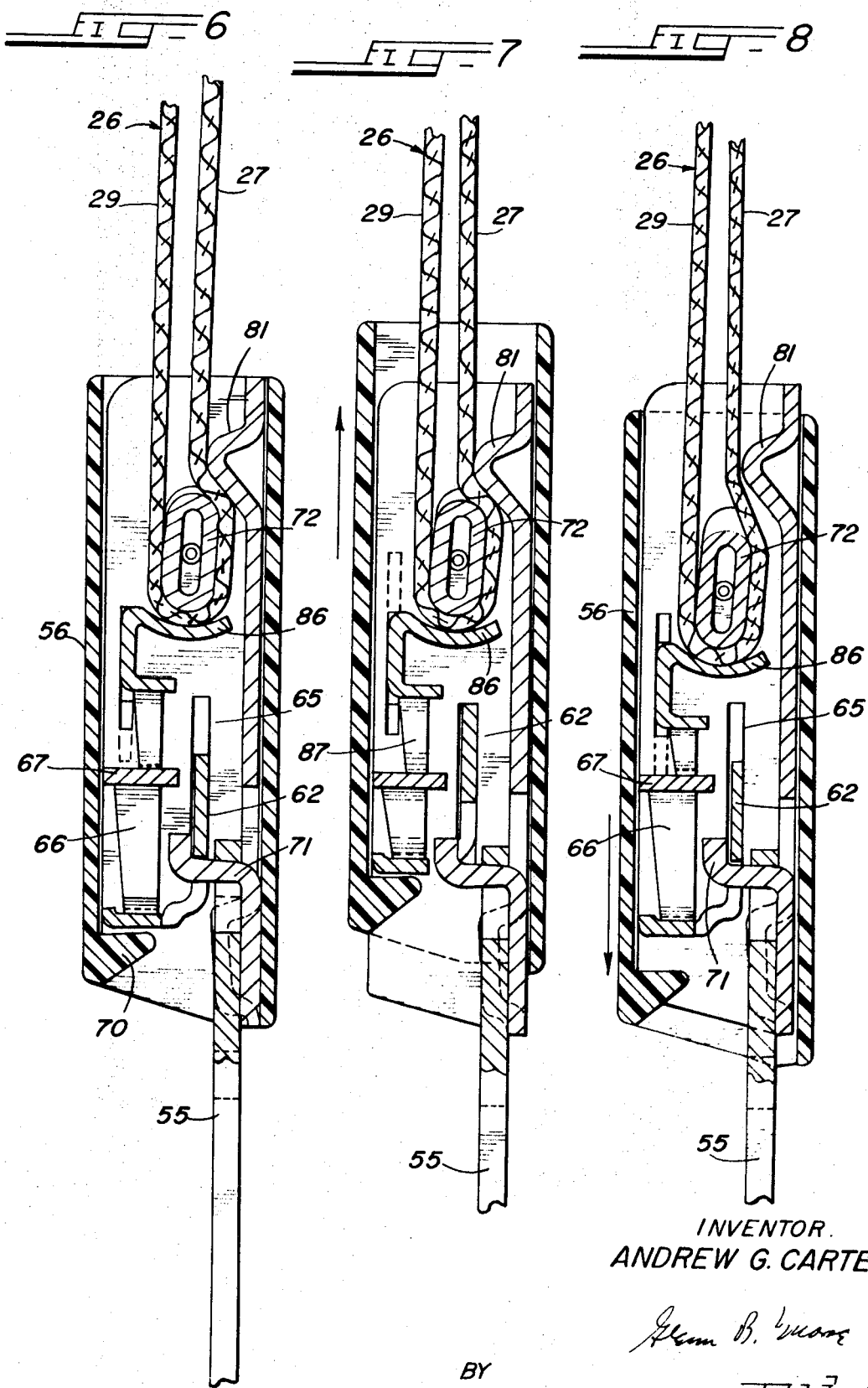

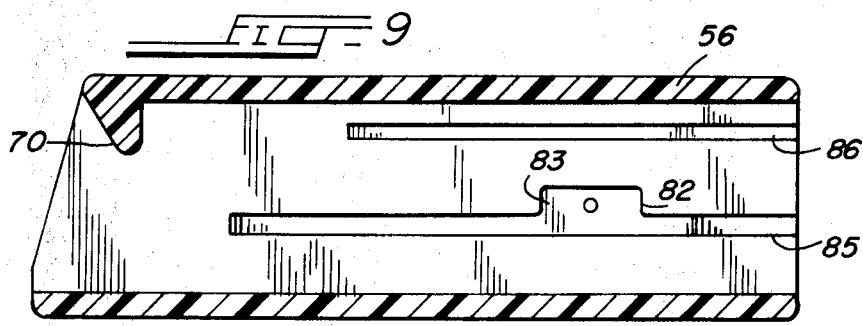
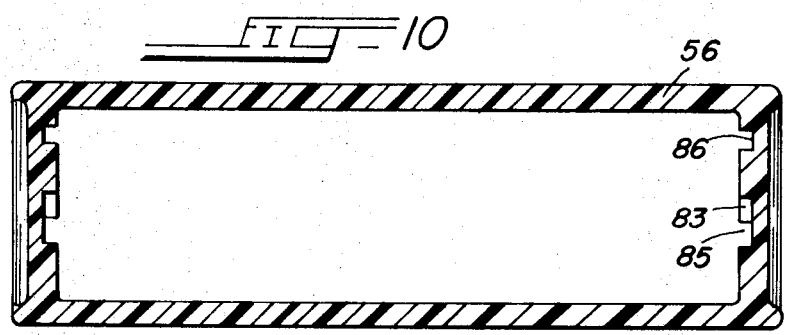
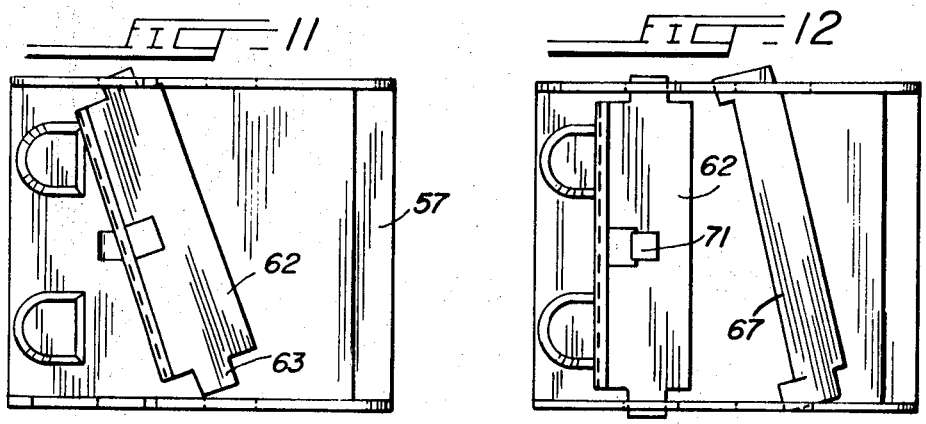
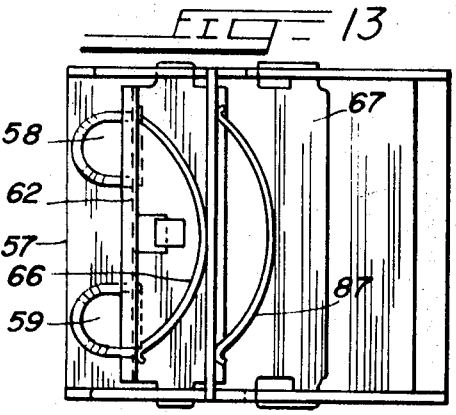
INVENTOR.
ANDREW G. CARTER

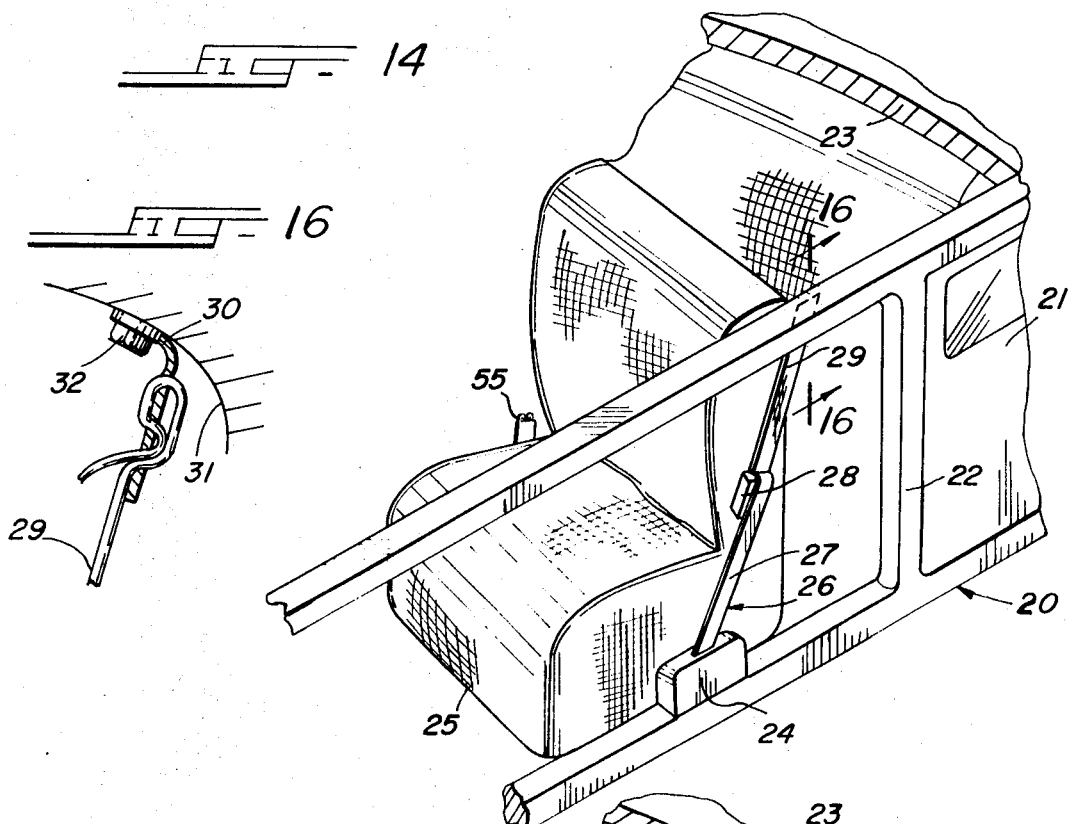

United States Patent Office 3,606,455
Patented Sept. 20, 1971

3,606,455
SAFETY HARNESS
Andrew G. Carter, 50 Market NW.,
Grand Rapids, Mich. 49502
Filed Apr. 29, 1969, Ser. No. 820,079
Int. Cl. A62b 35/00; B60r 21/00
U.S. Cl. 297—386                    3 Claims

ABSTRACT OF THE DISCLOSURE

A safety harness formed by a buckle interposed on a continuous belt between a roof terminal at one side of a seat and a floor-mounted locking take-up on the same side, the buckle being engageable with a floor-mounted terminal on the opposite side of the seat. The buckle has releasable restraint against relative movement along the belt toward the take-up, providing resistance to a movement of the belt through the buckle which extends the section of belt between the buckle and the roof terminal.

BACKGROUND OF THE INVENTION

The use of safety harnesses to protect occupants of vehicle seats is becoming more and more frequent, as people become used to the relatively minor inconvenience of using them. Obviously, a harness which is not properly engaged is of no value whatever. The reduction of the inconvenience associated with the use of this equipment is therefore vital, in order to provide the safety advantages that have been statistically proven.

A "harness" has commonly come to indicate a belt device having one section extending across the lap, and another running diagonally across the chest from a position near the hip across the opposite shoulder. The upper end of this diagonal belt section is usually connected to a terminal on the vehicle mounted near the junction of the roof and the side, and the lap section is anchored to a floor mounting at the opposite sides of the seat. Continuous belt arrangements have been proposed, with the belt extending from a fixed terminal to a locking take-up reel usually mounted on the floor of the vehicle at the same side of the driver's seat as the fixed terminal. A buckle is interposed on the belt, and releasably engages a floor terminal on the opposite side of the seat from the take-up. In the prior arrangement, the belt passes around a free roller in the buckle, resulting in complete equalization of the tension of the two sections of belt. An example of this arrangement has been noted in the Royce Pat. 3,411,602.

The equalization of tension in the two sections of the belt resulting from the arrangement described above has a functional disadvantage. While it permits the floor-mounted take-up to remove the slack from the entire harness, it also produces an undesirable behavior during crash conditions. The wearer of such a belt will have a considerable freedom of movement in a forward direction toward the steering column, or toward the dash panel, as a result of an extension of the upper portion of the harness accompanied by a tightening of the lower portion. In other words, the occupant is permitted a degree of rotation of his body about a generally horizontal axis, as one section of the belt pulls through the buckle at the expense of any looseness in the other section, or as a result of the position of the center of gravity tending to put a greater strain on the upper belt section. There appears to be a greater degree of resilience to the lap section of the belt, which obviously aggravates the condition.

SUMMARY OF THE INVENTION

A conventional safety belt buckle provided with a one-way belt clamp is incorporated in a continuous belt extending from a roof terminal down to a lockable take-up at the side of the vehicle seat. The buckle is engageable with a floor terminal on the opposite side of the seat. The belt is arranged with respect to the buckle so that the one-way resistance to relative movement of the belt with respect to the buckle prevents strain in the upper belt section from pulling the belt through the buckle under crash conditions at the expense of slack in the lap portion of the belt. A conventional lap-type safety belt buckle is normally provided with a belt clamp based upon a jamming action producing a "tight" and a "slack" section to the belt engaging the buckle. This arrangement is normally incorporated in the lap buckle to permit the user to pull through a section of belt to adjust belt tension, while the jamming action in the clamp prevents extension of the belt. This feature is utilized for a totally different purpose in the present invention, which is for controlling the relative tension existing between the two belt sections. Conventional lockable floor-mounted take-up reel devices may be utilized in conjunction with this invention, as well as conventional floor-mounted buckle connectors.

DESCRIPTION OF THE DRAWINGS

In the drawings, FIG. 1 is a perspective view showing an installation of a safety harness incorporating the present invention.

FIG. 2 is a sectional elevation on an enlarged scale showing a typical form of lockable floor-mounted take-up appropriate to the installation shown in FIG. 1.

FIG. 3 is a section showing the spring biasing system of the FIG. 2 mechanism.

FIG. 4 illustrates one of the clutch members of the FIG. 2 mechanism.

FIG. 5 is an exploded view showing the components of a form of buckle and floor terminal usable in conjunction with the present invention.

FIGS. 6, 7, and 8 show various positions of the buckle and its associated belt-clamping device.

FIGS. 9 and 10 are sectional views on axial and transverse planes of the handle of the buckle.

FIGS. 11, 12, and 13 show successive steps in the assembly of the buckle.

FIG. 14 illustrates the storage position of a harness assembly incorporating the present invention.

FIG. 15 shows a modified form of the invention usable in conjunction with a seat structure having sufficient rigidity to resist crash conditions.

FIG. 16 shows belt mounting means fixed to the roof.

DESCRIPTION OF THE PREFERRED EMBODIMENT

FIG. 1 illustrates an installation of a harness embodying this invention in conjunction with the driver's seat of an otherwise conventional vehicle. The vehicle 20 has the usual side structure including the rear door 21 and the post 22. The front door has been removed, as well as a portion of the roof 23, to illustrate the details of the installation. A lockable take-up unit 24 is mounted on the frame of the vehicle at the side of the seat 25, and receives the end of a continuous belt 26. The lap section of the belt 27 extends from the take-up unit over to the buckle 28, and the shoulder section 29 extends from the buckle to the terminal 30 shown in FIG. 15 at the junction area 31 between the side and roof structure of the vehicle. The terminal 30 may be one of the several conventional fixed belt connections, one of the simplest forms being the illustrated angle plate secured to the vehicle by bolts as shown at 32. The plate 30 has a group of parallel slots receiving the belt in the illustrated pattern of engagement.

The lockable take-up unit may be of a variety of types, the assembly shown in FIG. 2 being similar to that illustrated in U.S. Pat. 3,248,149. The support members 33 and 34 are bolted to the floor 35 as shown at 36 and 37. These members support a shaft 38 held in fixed relationship to the supports by the set screw 39. A reel 40 is rotatably mounted on the shaft 38, and is biased by the spiral spring 41 to wind the belt 26 onto the reel. The arrangement of the spring with respect to the reel shown in FIG. 3, the inner extremity of the spring being secured to a flat on the shaft 38 by the screw 42, with the outer end of the spring 43 being received in a slot 44 in the reel. The reel is locked against rotation by the action of the clutch member 45, which is rotatively fixed with respect to the shaft 38, but slidable axially to and from a position in which the teeth 46 on the clutch member interengage with the similar teeth on the reel 40. The shaft 38 is provided with opposite flats receiving the corresponding flat surfaces of the opening 47 in the clutch member. A spring 48 biases the clutch member into the locking position illustrated in FIG. 2. The shaft 49 of a solenoid generally indicated at 50 moves a yoke plate 51 to withdraw the clutch 45 to the right, through the pull rods 52 and 53 extending from the yoke plate to the clutch member 45. These pull rods slide freely through suitable holes in support 34. The solenoid 50 can be actuated in response either to a manually-controlled switch 54, or may be interrelated with the ignition system of the automobile so that the reel is locked at all times when the ignition is turned on. The details of the lockable take-up reel and its control form no part of the present invention.

The particular buckle mechanism indicated generally at 28 may be any one of a number of arrangements establishing a differential freedom of movement of the belt with respect to the buckle. A conventional seat belt has a jamming clamp securing the belt, which produces a "tight" section carrying the principal seat belt load, and the "free" section that can be pulled through manually to tighten the belt to the desired initial tension. Loosening of the belt to produce a greater degree of slack normally must be done while the belt is free of belt tension, such as when it is uncoupled. The buckle mechanism illustrated in FIGS. 5 through 13 is described and claimed in my co-pending application Ser. No. 542,813. A particularly useful feature of that buckle assembly, which was originally designed for a plain seat belt, is in the fact that movement of the belt handle in one direction will effect release on the buckle mechanism from the floor-mounted terminal 55 on the opposite side of the driver's seat from the locking take-up unit 24. The opposite direction of the sliding movement of the handle 56 has the effect of releasing the differential restraint on the belt, which will permit shifting of the belt with respect to the buckle assembly. The handle 56 encloses and slides axially on the U-shaped frame 57 of the mechanism. This frame has a pair of lugs 58 and 59 which are interengageable with the similarly-spaced openings 60 and 61 in the floor terminal 55. The locking action is maintained by the presence of the slide bar 62 assembled with its end tabs 63 in engagement with the slots 64 and 65 of the frame 57. A leaf spring 66 is supported by the bar 67 received in the notches 68 and 69 in the frame, urging the locking bar to the locking position illustrated in FIG. 6. The presence of the slide bar 62 in the FIG. 6 position prevents the abutments 58 and 59 from withdrawing from the openings 60 and 61. Unlocking of the device is accomplished by movement of the handle 56 to the right, as shown in FIGS. 6, 7, and 8, thus bringing the portion 70 against the slide bar 62, and moving it to the FIG. 7 position allowing the escape of the floor terminal 55. The hook 71 formed integrally with the frame 57 stabilizes the central portion of the slide members 62 when the unit is under extensive load.

Movement of the handle 56 to the left to the position shown in FIG. 8 has the effect of releasing the jamming action on the belt 26. The tubular bar 72 is fitted with end plugs 73 and 74 which are biased outwardly with respect to each other by the spring 75 received on the projections 76 and 77. Projections as shown at 78 on the opposite end of the plugs engage the slots 79 and 80 in the frame to permit a limited degree of movement of the bar 72 toward and away from the abutment 81 formed in the base of the frame. The handle movement illustrated in FIG. 8 has the effect of bringing the shoulders 82 on the opposite sides of the handle 56 into engagement with the projection portions 78, which extend beyond the outer surface of the frame 57. The assembly of the device is maintained by virtue of the fact that the end plugs can be depressed inwardly to the point where the handle 56 can be slid over the frame, with all of the buckle mechanism components in position, from the left, as viewed in FIGS. 6 through 8. Once into the fully assembled position, the end plugs 73 and 74 move outwardly under the action of the spring 75 to engage the projections 78 between the shoulders 82 and 83. Disassembly is effected by the insertion of a suitable instrument through the opening 84 to depress the end plugs. The slots 85 and 86 on the opposite sides of the handle 56 provide clearance for projecting portions of the bars 62 and 86. The latter functions as a pressure shoe establishing a braking action on the belt so that it will not slide with full freedom around the bar 72 in the direction opposite from the jamming action, or under conditions of vibration. A second leaf spring 87 provides the gentle pressure urging the shoe 86 against the belt 26. As long as the bar 72 is in the position illustrated in FIGS. 6 and 7, a pull on the shoulder portion 29 will tend to move the bar 72 to the right, entrapping the belt between the bar and the abutment 81. This jamming action will be sufficient to resist the loading that may be applied to the belt. With this buckle mechanism interconnected with the belt harness as shown in FIGS. 1, 14, and 15, the shoulder section takes its full loading under crash conditions without pulling slack from the belt section through the buckle assembly 28. The strength of the spring 41 of the locking take-up unit is selected with reference to the particular degree of resistance to the passage of the belt around the bar 72 caused by the shoe 86, so that the take-up reel will be able to pull the belt through to remove the slack from both the seat and shoulder portions of the belt. A harness of this form will protect the driver from having his chest area move forward into damaging contact with the steering column.

FIGS. 11, 12, and 13 are of secondary importance to the present invention, but illustrate the sequence of the assembly of the components of the particular buckle unit that has been selected for illustration. The bar 62 is of a particular length, including its end-projections 63, such that it may be installed in engagement with the slot 65 in an inclined position, as shown in FIG. 11, and then be swung into the fully assembled position illustrated in FIG. 12, followed by similar placement of the bar 67. The bar 72 and its related components is then added, followed by the application of the handle 56, as previously described.

FIG. 15 shows a modified form of the invention, in which the upper harness terminal 88 is applied directly to the seat 89, rather than to the roof-side junction of the primary vehicle structure. The arrangement shown in FIG. 15 is possible only when the seat 89 is sufficiently rugged to resist the crash stresses, and is correspondingly secured to the floor structure of the vehicle. One of the highly desirable results of either modification of the invention appears in FIG. 14. When the buckle 28 is disconnected from the floor terminal 55, the natural tendency of the take-up 24 will be to absorb whatever slack is available in the belt 26, thus resulting in suspending the buckle 29 in practically a straight line between the upper terminal and the take-up reel, thus removing the belt from random positions on the seat. The buckle 28 is left suspended in a position where it is easily accessible, and the unlocked condition of the take-up unit will permit the buckle to be pulled across in front of the occupant of the seat to a position where it can be connected to the floor terminal 55. This direction of pull on the buckle has a tendency to free the belt clamp, and thus permit extension of the shoulder section of the belt as required. When the locking condition of the take-up unit 25 is reestablished by whatever controls are associated with this unit, the harness becomes a very effective safety device.

I claim:

1. In combination with a vehicle having a seat, a safety harness including a continuous belt, elevated terminal means at one side of said seat receiving one end of said belt, a locking take-up mounted on said vehicle at one side and below said terminal means and receiving the opposite end of said belt, a buckle interposed on said belt between said terminal means and take-up, and a floor terminal mounted on said vehicle on the opposite side of said seat from said take-up and adapted for releasable locking interengagement with said buckle, wherein the improvement comprises:

directional belt-gripping means on said buckle adapted to establish greater resistance to relative movement of said buckle along said belt toward said locking take-up than toward said elevated terminal means.

2. A safety harness as defined in claim 1, wherein said belt-gripping means establishes a jam clamp action in one direction on said belt.

3. A safety harness as defined in claim 1, wherein said elevated terminal means is mounted on said vehicle adjacent the junction of the roof and side thereof.

References Cited

UNITED STATES PATENTS

| | | | |
|---|---|---|---|
| 3,248,149 | 4/1966 | Carter | 297—388 |
| 3,348,881 | 10/1967 | Weman | 297—388 |
| 3,411,602 | 11/1968 | Royce | 280—150X |
| 3,453,699 | 7/1969 | Smith et al. | 297—389X |

CASMIR A. NUNBERG, Primary Examiner

U.S. Cl. X.R.

280—150SB; 297—389